(12) United States Patent
Lee

(10) Patent No.: US 6,345,364 B1
(45) Date of Patent: Feb. 5, 2002

(54) POWER SUPPLY OF DISPLAY APPARATUS WITH UNIVERSAL SERIAL BUS DEVICE

(75) Inventor: Joo-Hyoung Lee, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/287,340

(22) Filed: Apr. 7, 1999

(30) Foreign Application Priority Data

Apr. 11, 1998 (KR) .............................................. 98-12976

(51) Int. Cl.[7] .................................................. G06F 1/26
(52) U.S. Cl. ....................................................... 713/324
(58) Field of Search ................................. 713/300, 320, 713/323, 324, 310, 340

(56) References Cited

U.S. PATENT DOCUMENTS

| | | | |
|---|---|---|---|
| 5,471,625 A | 11/1995 | Mussemann et al. | |
| 5,657,257 A | 8/1997 | Lee | |
| 5,659,763 A | 8/1997 | Ohashi | |
| 5,799,196 A | 8/1998 | Flannery | |
| 5,870,086 A | 2/1999 | Bang | |
| 5,884,068 A | 3/1999 | Conary et al. | |
| 6,009,529 A | * 12/1999 | Park | ............................ 713/320 |
| 6,105,143 A | * 8/2000 | Kim | ............................ 713/324 |
| 6,178,513 B1 | * 1/2001 | Lee | ............................ 713/300 |

* cited by examiner

Primary Examiner—Glenn A. Auve
(74) Attorney, Agent, or Firm—Robert E. Bushnell, Esq.

(57) ABSTRACT a power supply of the display apparatus includes a switching mode power supply forming the main power supply of the display apparatus. The power supply of this invention includes an auxiliary power supply for supplying power with a universal serial bus (USB) hub. The power supply further includes a display power management signaling (DPMS) control circuit for managing the power saving between the full-on, standby, suspend, and power-off modes, a relay switch is provided across the power line directed to the main power supply. The DPMS control circuit responds to input status of the horizontal and vertical synchronization signals (Hsync, Vsync) and, in the power-off mode, it produces a control signal that cuts off the relay switch. The power supply of this invention provides a stable supply power with the USB hub even if the display apparatus enters the power-off mode of DPMS. Further, the power supply of this invention can cut off power supply directed to the main power supply when the display apparatus enters the power-off mode.

12 Claims, 3 Drawing Sheets

POWER SUPPLY OF DISPLAY APPARATUS WITH UNIVERSAL SERIAL BUS DEVICE

CLAIM OF PRIORITY

This application makes reference to, incorporates the same herein, and claims all benefits accruing under 35 U.S.C. §119 from an application for Power Supply Of Display Apparatus With Universal Serial Bus Device earlier filed in the Korean Industrial Property Office on Apr. 11, 1998 and there duly assigned Serial No. 12976/1998.

1. Field of the Invention The present invention relates to power supply apparatus, and more particularly to a power supply of display apparatus having universal serial bus hub device.

2. Description of the Related Art

Display apparatus using cathode ray tubes have been used in the personal computer monitors for their high resolution and contrast. Despite technological developments in the display apparatus, the power consumption of the CRT monitor is still considerable. To reduce the monitor power consumption, most computer monitors have power saving function or "green" function as recommended by the Video Electronics Standard Association (VESA). The power saving function of the monitor is performed if there is no input to operate a computer system for a predetermined period of time. Complying with the Display Power Management Signaling (DPMS) scheme established by VESA, the video adapter of the computer system provides the monitor with the horizontal and vertical synchronization signals varied with the power saving modes between full-on, standby, suspend, and power-off state. It automatically reduces the power consumption of the monitor such that an amount of power is decreased with the lapse of time set by the DPMS control program.

In the full-on mode, both horizontal and vertical synchronization signals are in active state and are supplied with the display apparatus that allows normal operation of the display apparatus with consuming almost the power rating. In the standby mode, only vertical synchronization signal is in active state that allows the blank monitor screen with consuming less power than in the full-on mode. Further, in the suspend mode, only horizontal synchronization signal is in active state that allows the blank monitor screen with consuming much less power than in the standby mode. The power-off mode is the least power consumption level, which interrupts power supplies directed to all components in the display apparatus except the subsystem which can restore the system to the fill-on state. In this state, both horizontal and vertical synchronization signals are in inactive state.

In addition to this problem, during the power-offmode of DPMS, the power supply circuitry of the switching mode power supply (SMPS) will be operated continuously, which results in unnecessary power consumption in the display apparatus.

U.S. Pat. No. 5,799,196 for a Method and Apparatus of Providing Power Management Using a Self-Powered Universal Serial Bus (USB) Device to Flannery discloses how a computer system receives stand-by power from a peripheral bus incorporating a power source independent of the main power supply unit of the computer system. However, the disclosure does not use two power supplies. In addition, there appears to be no mechanism for shutting down power to the switching mode power supply or the main power supply when power to a peripheral is cut off.

U.S. Pat. No. 5,870,086 for a Power Saving Display Device and Method For Controlling Power Therefor to Bang discloses a main power circuit, an auxiliary power circuit, and a discriminator for discriminating whether the horizontal and vertical synchronous signals are inputted. However, there is no mention of power being supplied to a universal serial bus or any kind of bus during a power-down state.

U.S. Pat. No. 5,657,257 for a Power-Supply Controller of Computer to Lee discloses a power supply and a power controller to manage power to a computer. However, there is no mention of power being supplied to a universal serial bus or any kind of bus during a power-down state.

I have not seen a power supply that both supplies power to a universal serial bus hub and cuts off power to the switching mode power supply circuitry when the display device is in a power off state.

SUMMARY OF THE INVENTION

The present invention is intended to solve the prior art problems, and it is therefore an object of the invention to provide a power supply of display apparatus which can provide a stable supply power with the universal serial bus hub even if the display apparatus enters the power-off mode of DPMS.

It is another object of the invention to provide a power supply of display apparatus which can cut off power supply directed to the switching mode power supply circuitry when the display apparatus enters the power-off mode of DPMS.

In accordance with the present invention, the power supply comprises: a rectifier converting an AC input voltage into a DC output voltage; a first power supply circuitry for generating regulated output voltage required in the display apparatus when it receives the rectifier output voltage; a second power supply circuitry for supplying power with the USB hub, in which the second power supply circuitry is applied with the rectifier output voltage; a switch provided across the power line between the output of the rectifier and the input stage of the first power supply circuitry; and a controller in response to input status of the display power management signal corresponding to the power-off mode to produce a control signal that turns off the power line switch.

Further, the second power supply circuitry includes a DC/DC converter for outputting desired voltage to the USB hub.

Preferably, the display power management signal includes the horizontal and vertical synchronization signals (Hsync, Vsync) provided by the system host. Also, the power line switch includes a relay switch and relay drive circuitry, and wherein the relay switch uses an single pull single throw (SPST) normal-close switch.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE INVENTION

Figure 1:
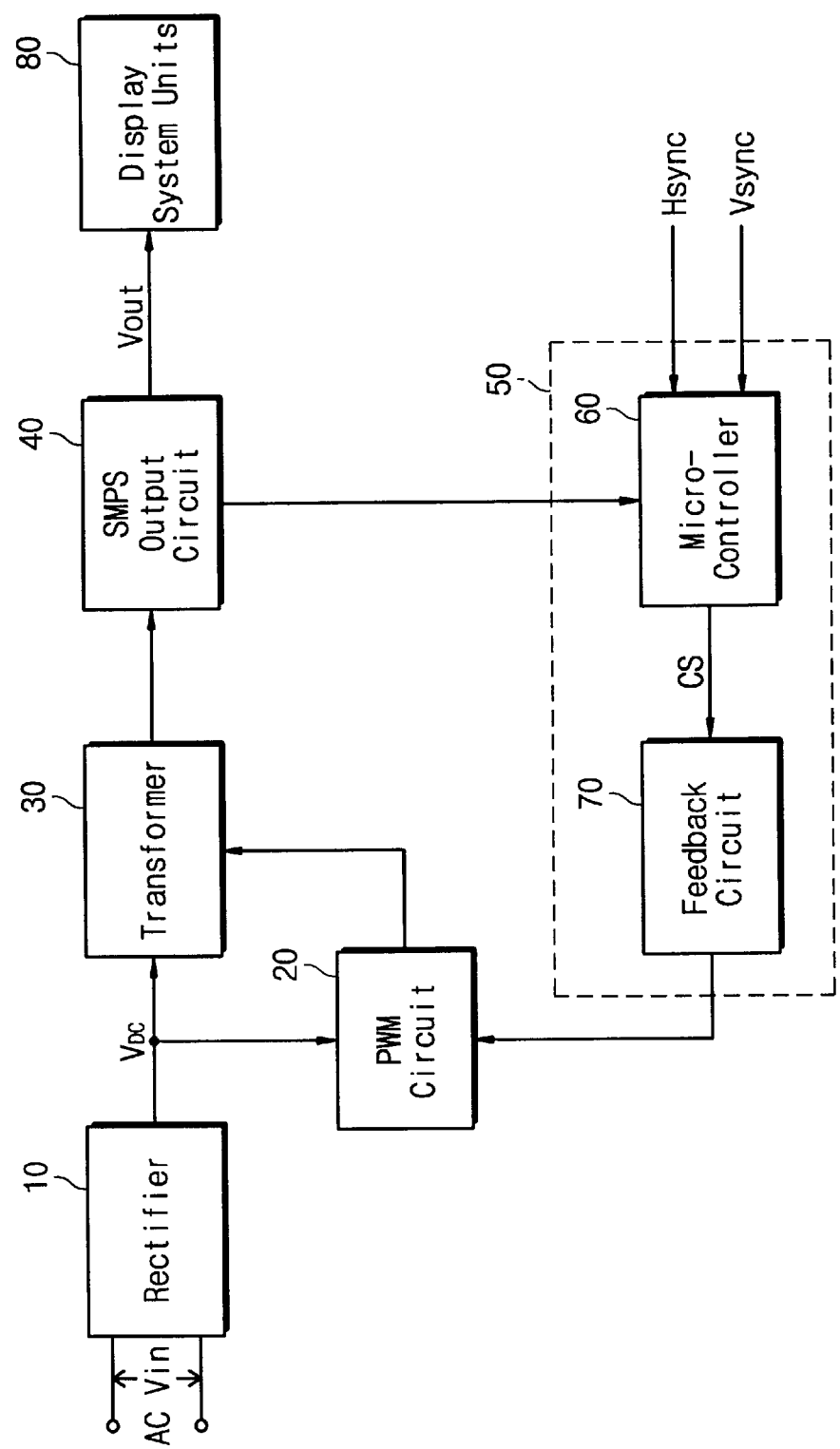
FIG. 1 is a block diagram showing an earlier power supply provided with a DPMS control circuit used in a display apparatus.

FIG. 1 shows an earlier power supply device with DPMS control circuit used in a display apparatus. The power supply generally consists of a switching mode power supply (SMPS) circuit and a DPMS control circuit. The switching mode power supply comprises, for example, a rectifier 10, a PWM (Pulse Width Modulation) circuit 20, a power transformer 30, and output circuit 40. The DPMS control circuit 50 includes a microcontroller 60 and a feedback circuit 70.

The rectifier 10 converts an AC input voltage Vin into a DC voltage and supplies it with the input stage of the transformer 30 and PWM circuit 20. Output circuit 40 located at output stage of the transformer 30 supplies regulated voltages Vout with the display system units 80. The PWM circuit 20 performs the well-known switching operation to adjust duty ratio of the output pulse based on the feedback current provided by the feedback circuit 70. The microcontroller 60 senses the output voltage Vout and produces a control signal representative of variation of the output voltage. The amount of feedback current is controlled by the control signal such that the feedback current is increased if secondary induction voltage of the transformer 30 is increasing, which results in decrease of the duty ratio and constant output voltage.

The microcontroller 60 also performs DPMS control function in response to the input status of the horizontal and vertical synchronization signals Hsync, Vsync provided by the system host. In the power-off mode, when both horizontal and vertical synchronization signals are in inactive state, the microcontroller 60 produces a control signal CS that allows the switching mode power supply to interrupt power supply directed to the display system units 80, but continues to feed power to microcontroller 60. Thus, the CRT device and all video signal processing circuits and auxiliary circuits are not operated, and the display apparatus goes into the least power consumption level that consumes only 5 to 8 watts.

If the display apparatus is provided with a universal serial bus (USB) hub that is used to be connected with peripheral devices such as the keyboard and mouse, a power (for example, Vcc of +5 volts) should be supplied with a terminal of the USB hub continuously. However, if it is designed to supply power with the USB hub from the output voltage Vout of the SMPS output 40, the power supply directed to the USB hub will be interrupted during the power-off mode of DPMS and thus the peripheral device connected to the USB hub will not be operated.

Figure 2:
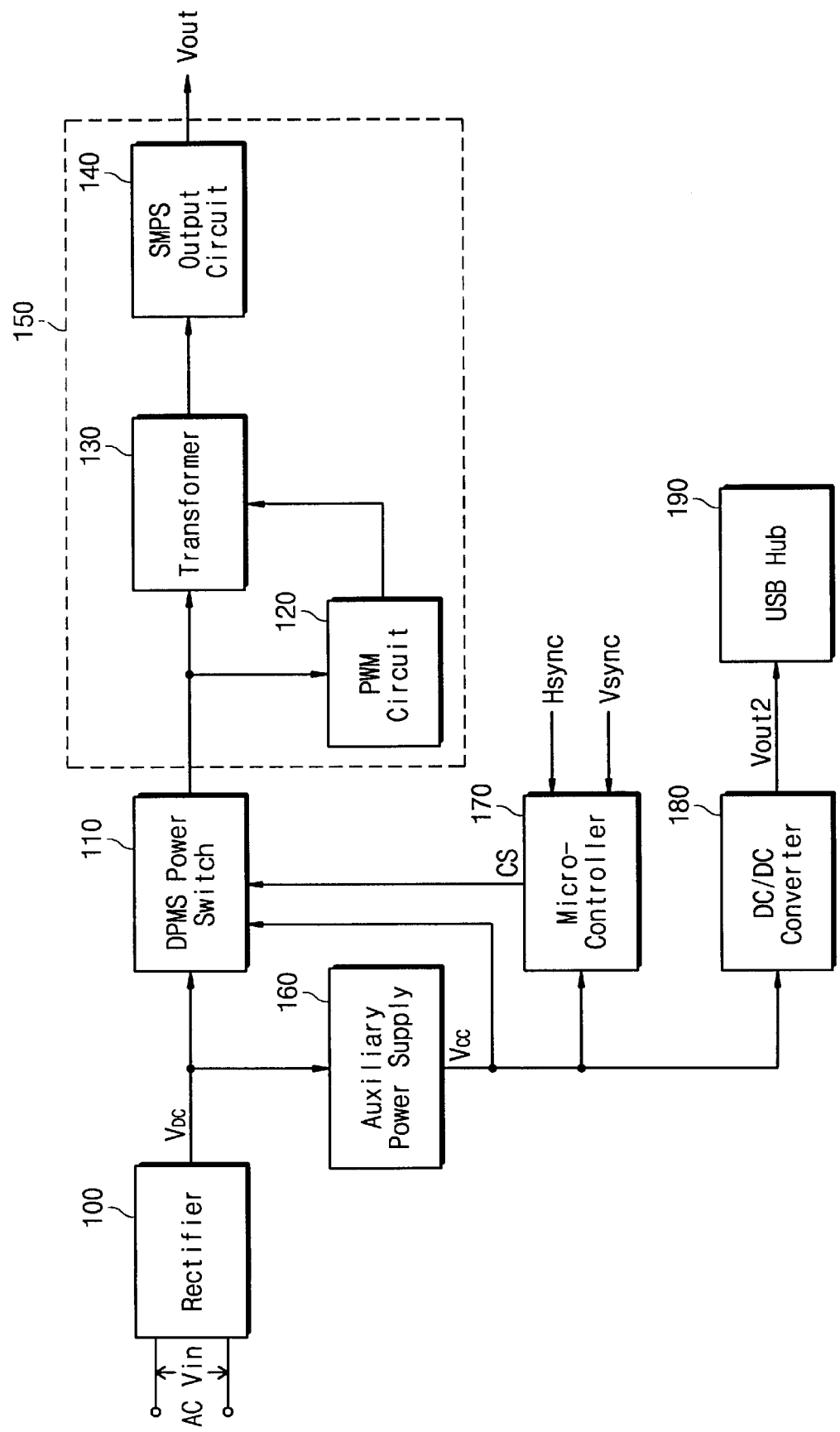
FIG. 2 is a block diagram of a power supply of a display apparatus having an auxiliary power supply for the universal serial bus hub in accordance with the present invention.

Referring to FIG. 2, there is shown a power supply of display apparatus in accordance with the present invention. As is in the prior art power supply shown in FIG. 1, the power supply of the invention includes a switching mode power supply forming the main power supply 150 of the display apparatus. In particular, the power supply of this invention includes an auxiliary power supply 160 for supplying power with a universal serial bus (USB) hub 190. The power supply further includes a display power management signaling (DPMS) control circuit for managing the power saving between the full-on, standby, suspend, and power-off modes.

The switching mode power supply (SMPS) circuit comprises, for example, a rectifier 100, a PWM (Pulse Width Modulation) circuit 120, a power transformer 130, and output circuit 140. The DPMS control circuit includes a microcontroller 170 and a power switch 110. The power switch 110 is provided across the power line between the output of the rectifier 100 and input stage of the transformer 130. Also, the auxiliary power supply 160 and the DPMS power switch 110 are coupled to the DC output of the rectifier 100 in order to produce an operating voltage Vcc that is being applied to the microcontroller 170 and power switch 110 of the DPMS control circuit (see FIG. 3) as well as the USB hub 190. The USB hub 190 may include at the power input terminal a DC/DC converter 180 to convert the input operating voltage Vcc into a required operating voltage Vout2. The configuration of the power switch 110 will be described in detail with reference to FIG. 3.

Figure 3:
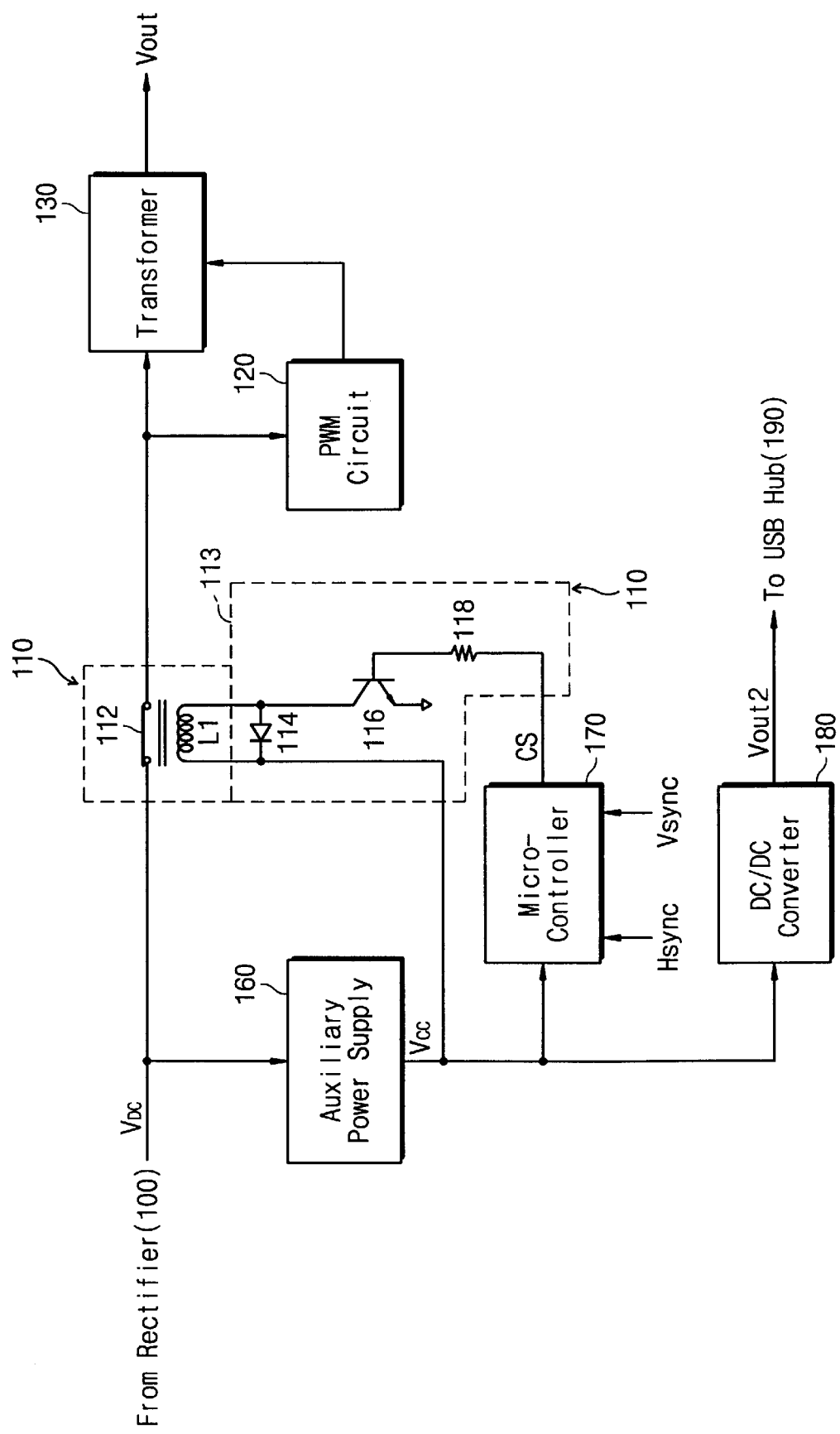
FIG. 3 is a schematic circuit diagram of a DPMS power switch circuit of the power supply shown in FIG. 2.

In FIG. 3, the power switch 110 includes a relay switch 112 and a relay drive circuit 113. The relay switch 112 uses an SPST normal-close switch and normally is provided with an energizing coil L1. One end of the energizing coil L1 is connected with Vcc output terminal of the auxiliary power supply 160, and the other end thereof is connected with the collector of the drive transistor 116. The base of the transistor 116 is connected with one control output terminal of the microcontroller 170 via a bias resistor 118. The emitter of the transistor 116 is grounded. Here, reference number 114 denotes a protection diode connected between both ends of the energizing coil L1.

In operation, the rectifier 100 converts an AC input voltage Vin into a DC output voltage $V_{DC}$ and applies it with the input stage of the transformer 130 and PWM circuit 120 via the relay switch 112. The PWM circuit 120 performs well-known switching operation to adjust duty ratio of the output pulse. The PWM circuit 120, the transformer 130 and output circuit 140 form what is called first power supply circuitry. Output circuit 140 of the transformer 130 supplies regulated voltages Vout with the display system units.

Further, the auxiliary power supply 160 supplies an operating voltage Vcc to the microcontroller 170 and DC/DC converter 180 as well as the drive circuit 113 of the power switch 110. Then, the microcontroller 170 performs DPMS control function in response to the input status of the horizontal and vertical synchronization signals (Hsync, Vsync) provided by the system host. Also, the DC/DC converter 180 provides another output voltage Vout2 for the USB hub 190. Auxiliary power supply 160, microcontroller 170 and DC/DC converter 180 form what is called as the second power supply circuitry.

In the power saving mode other than the power-off mode, the microcontroller 170 outputs logic low level control signal CS to the base of the drive transistor 116. In this state, neither the transistor 116 nor the energizing coil L1 of the relay switch 112 will be operated. Thus, the relay switch 112 remains closed and the DC output voltage $V_{DC}$ of the rectifier 100 is supplied with the input stage of the transformer 130.

On the other hand, in the power-off mode, when both horizontal and vertical synchronization signals are in inactive state, the microcontroller 170 recognizes the input status of the synchronization signals and produces a control signal CS having logic high level. This allows the drive transistor 116 to be turned on and the coil L1 of the relay switch 112 to be energized. Thus, when the monitor system enters the power-off mode, the relay switch 112 is opened. Opening of the switch 112 will interrupt DC output voltage $V_{DC}$ directed to the main power supply unit 150. Therefore, the display system units including the CRT and the related video signal processing circuits and auxiliary circuits will not be supplied with the power, and the display apparatus may go into the least power consumption level (below 5 watts) which is lower than that of the prior art circuit.

Further, in this power-off mode, the microcontroller 170 is operated with the power supplied by the auxiliary power supply 160 and continues to monitor the input status of the synchronization signals. Also, the DC/DC converter 180 continues to supply an operating voltage Vout2 with the USB hub 190 regardless of any power saving mode.

As apparent from the foregoing description, the power supply of this invention provides a stable supply power with the universal serial bus hub even if the display apparatus enters the power-off mode of DPMS. Further, the power supply of this invention provides for a more effective power saving which can eliminate power consumption in the switching mode power supply circuitry when the display apparatus enters the power-off mode.

What is claimed is:

1. A power supply of display apparatus having universal serial bus (USB) hub, the power supply comprising:
   a rectifier converting an AC input voltage into a DC output voltage;
   a first power supply circuitry for generating regulated output voltage required to energize a display when it receives the rectifier output voltage;
   a second power supply circuitry for supplying power to the USB hub, in which the second power supply circuitry receives said DC output voltage from said rectifier as input to said second power supply circuitry;
   a power switch disposed between the output of the rectifier and an input of the first power supply circuitry; and
   a controller outputting a control signal that switches said power switch so that no power is supplied to said first power supply circuitry in response to display power management signals input to said controller, said display power management signals corresponding to a power-off mode.

2. The power supply of claim 1, wherein the second power supply circuitry comprises a DC/DC converter for outputting desired voltage to the USB hub.

3. The power supply of claim 2, said second power supply circuitry further comprising an auxiliary power supply converting said DC output voltage from said rectifier to a desired DC voltage for input to said DC/DC converter.

4. The power supply of claim 1, wherein the first power supply circuitry comprises a switching mode power supply (SMPS) circuitry.

5. The power supply of claim 1, wherein the display power management signals comprise a horizontal and a vertical synchronization signal (Hsync, Vsync) provided by a system host.

6. The power supply of claim 1, wherein the power switch comprises a relay switch and relay drive circuitry, wherein the relay switch is a single pull single throw (SPST) switch wherein power to said first power supply circuitry is interrupted when said SPST switch is open.

7. A power supply of a display apparatus having a universal serial bus hub, the power supply comprising:
   a rectifier for converting input AC voltage to output DC voltage;
   a display power management signaling power switch having an input and an output, said input of said display power management signaling power switch connected to the DC output of said rectifier;
   a pulse width modulation circuit having an input and an output, said input of said pulse width modulation circuit connected to said output of said display power management signaling power switch;
   a transformer having an input and an output, said input of said transformer connected to said output of said display power management signaling power switch, said output of said pulse width modulation circuit connected to said transformer;
   a power output circuit connected to said output of said transformer, output of said power output circuit being used to power a display of said display apparatus;
   an auxiliary power supply having an input and an output, said input of said auxiliary power supply being connected to said DC output of said rectifier;
   a microcontroller having horizontal and vertical synchronization signals as inputs and having said output of said auxiliary power supply as an input, said microcontroller producing a control signal as output which is used to control said display power management signaling power switch; and
   a DC to DC converter having an input and an output, said input of said DC to DC converter connected to said output of said auxiliary power supply and said output of said DC to DC converter connected to a universal serial bus hub.

8. The power supply of claim 7, wherein said display power management signaling power switch can be either in an open or a closed state, said display power management signaling power switch being in an open state only when both said horizontal and said vertical synchronization signals are in an inactive state, thus denying power to said pulse width modulation circuit, said transformer, said power output circuit and said display while power is continuously being delivered to said universal serial bus hub.

9. The power supply of claim 7, wherein said display power management signaling power switch comprises:
   a bias resistor having a first end and a second end, said first end of said bias resistor connected to said control signal output of said microcontroller;
   a transistor having a base terminal, an emitter terminal, and a collector terminal, said emitter terminal being connected to electrical ground, said base terminal being connected to said second end of said bias resistor;
   a diode having a cathode and an anode, said anode connected to said collector terminal of said transistor and said cathode connected to said auxiliary power supply;
   a coil having a first end and a second end, said first end connected to said collector terminal of said transistor and said second end connected to said cathode of said diode; and
   a single pole single throw switch connected between said output of said rectifier and said input of said transformer, said single pole single throw switch being in the proximity of said coil allowing current in said coil to open and close said single pole single throw switch depending on the control signal output from said microcontroller.

10. A method of denying power to a display device while continuing to provide power to a universal serial bus hub, comprising the steps of:
    splitting rectified DC power to energize a first circuit and a second circuit, said first circuit energizes said display device while said second circuit energizes a universal serial bus hub;
    inactivating both horizontal and vertical synchronization signals;
    converting said inactive horizontal and vertical synchronization signals into an active control signal; and
    opening a power switch by said active control signal, said power switch being placed between a rectifier and said first circuit, said active control signal denying power to said first circuit by said active control signal while maintaining power delivered to said second circuit and said universal serial bus hub.

11. The method of claim 10, said first circuit comprising:

a transformer having a first input and an output, said first input being connected to said power switch on a side of said power switch opposite said rectifier;

a pulse width modulation circuit having an input and an output, said input being connected to said first input of said transformer and said output being electrically connected to a second input of said transformer; and an output circuit having an input connected to said output of said transformer, said output of said output circuit being electrically connected to said display device.

12. The method of claim 11, said second circuit comprising:

an auxiliary power supply having an input and an output, said input being electrically connected to said rectified DC power, said output being connected to said power switch and a microprocessor, said auxiliary power supply outputting a first DC voltage; and a DC/DC converter having an input and an output, said input being electrically connected to said output of said auxiliary power supply and said output being connected to said universal serial bus hub, said DC/DC converter receiving said first DC voltage and delivering a second DC voltage to said universal serial bus hub.

* * * * *